(12) United States Patent
Chen et al.

(10) Patent No.: US 11,231,073 B2
(45) Date of Patent: Jan. 25, 2022

(54) TWO-STAGE UNIVERSAL JOINT

(71) Applicant: YUAN LI HSING INDUSTRIAL CO., LTD., Taichung (TW)

(72) Inventors: Chia-Yi Chen, Taichung (TW); Hui-Chien Chen, Taichung (TW)

(73) Assignee: YUAN LI HSING INDUSTRIAL CO., LTD., Taichung (TW)

( * ) Notice: Subject to any disclaimer, the term of this patent is extended or adjusted under 35 U.S.C. 154(b) by 280 days.

(21) Appl. No.: 16/557,202

(22) Filed: Aug. 30, 2019

(65) Prior Publication Data

US 2020/0072294 A1 Mar. 5, 2020

(30) Foreign Application Priority Data

Aug. 30, 2018 (TW) .................................. 107130437

(51) Int. Cl.
*F16D 3/221* (2006.01)
(52) U.S. Cl.
CPC .................................. *F16D 3/221* (2013.01)

(58) Field of Classification Search
CPC . F16D 3/221; F16D 3/20; F16D 1/108; F16D 2001/102; B25B 23/0035; B25B 23/0028; B25G 3/38
USPC .................................................. 464/150, 158
See application file for complete search history.

(56) References Cited

U.S. PATENT DOCUMENTS 7,278,342 B1 * 10/2007 Chang ................. B25B 23/0028
                                                81/177.75
11,007,625 B2 * 5/2021 Chen ................... B25B 23/0035

* cited by examiner

*Primary Examiner* — Greg Binda
(74) *Attorney, Agent, or Firm* — Muncy, Geissler, Olds & Lowe, P.C.

(57) ABSTRACT

A two-stage universal joint includes a sleeve, a driving member and a restricting member. The sleeve defines an axial direction and includes a receiving groove and an assembling portion. The driving member includes a polygonal ball head. The polygonal ball head has a plurality of arcuate portions. The polygonal ball head is inserted into the receiving groove. The driving member is slidable between a first position and a second position relative to the sleeve.

10 Claims, 8 Drawing Sheets

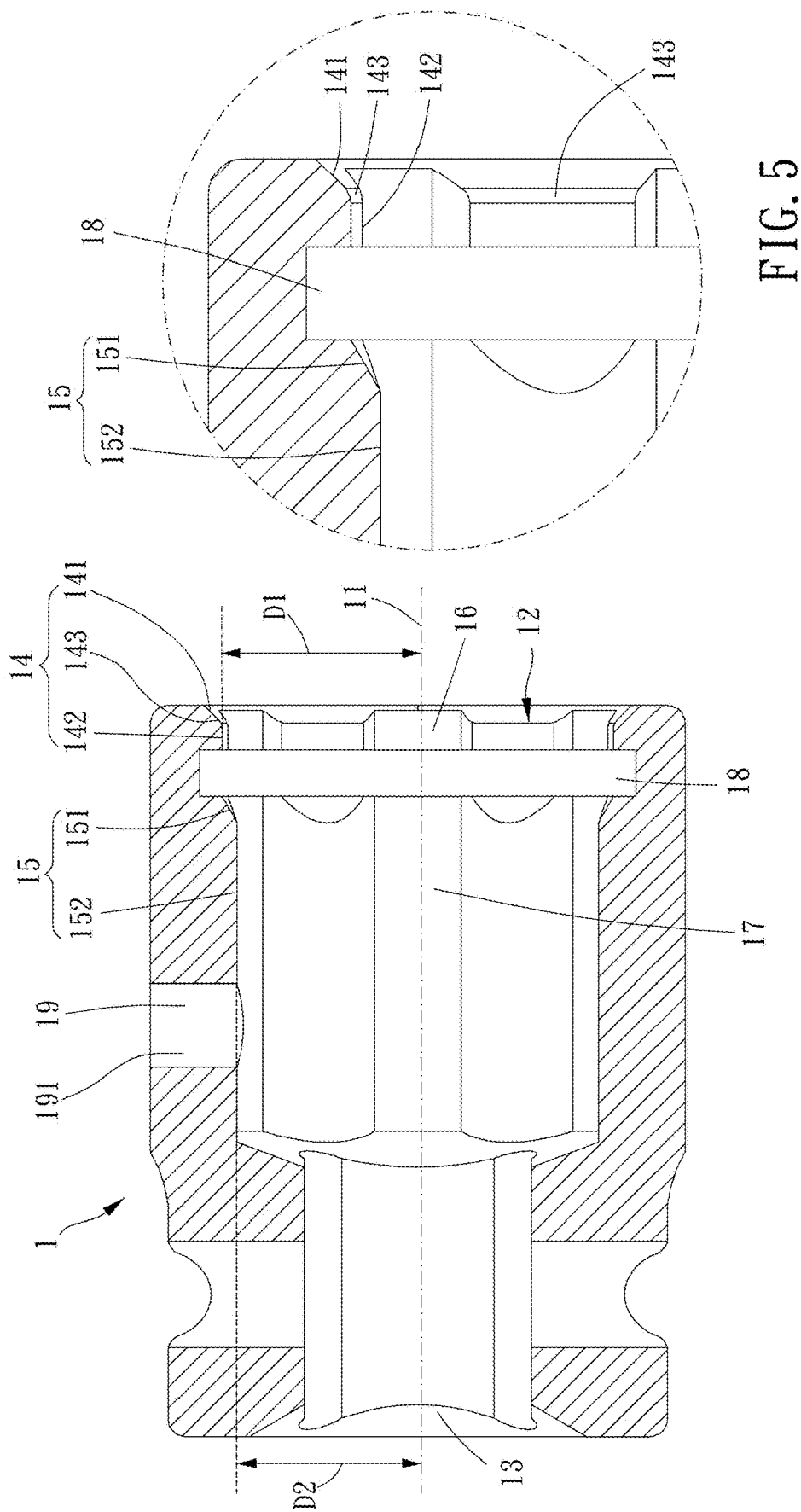

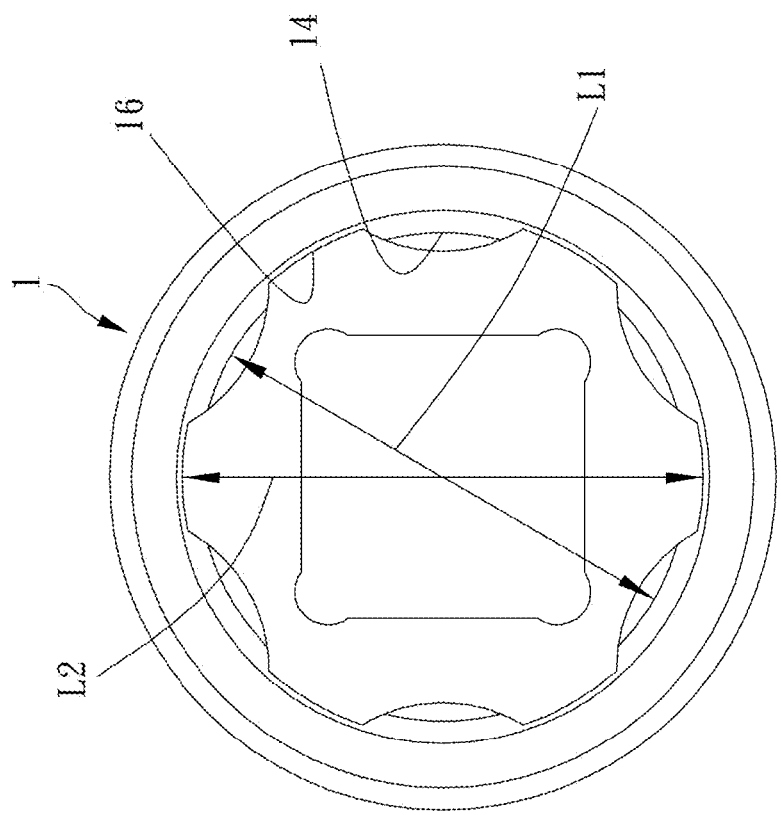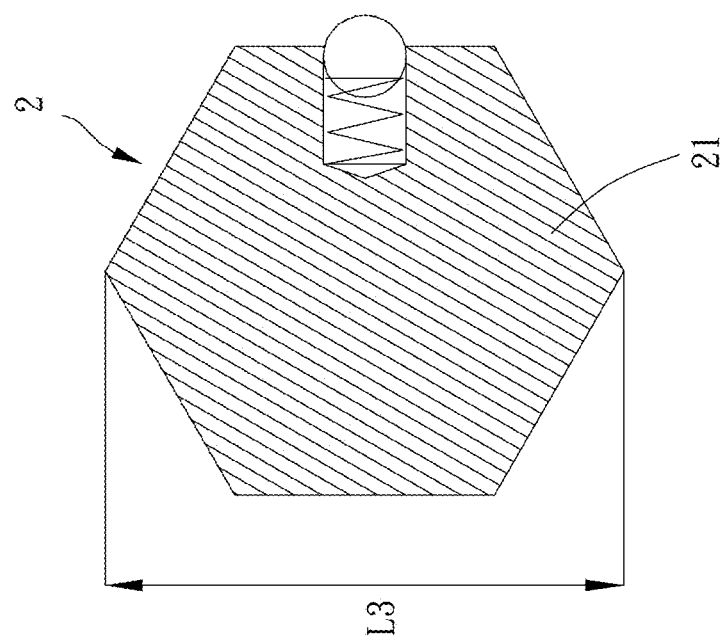
FIG.6

TWO-STAGE UNIVERSAL JOINT

BACKGROUND OF THE INVENTION

Field of the Invention

The present invention relates to a two-stage universal joint.

Description of the Prior Art

A universal joint is a kind of hand tool which is rotatable at various angles. The universal joint includes a ball head seat and a driving lever. One end of the driving lever has a ball head which is non-rotatably and slidably disposed within the ball head seat. The driving lever is slidable in a fixed position and a swing position relative to the ball head seat. A radial projection of the driving lever is abutted against the ball head seat and is non-swingable relative to the ball head seat when the driving lever is in the fixed position. The radial projection of the driving lever is unblockable by the ball head seat and is swingable relative to the ball head seat when the driving lever is pulled toward the swing position. As a result, the universal joint is rotatable at various angles for easy operation in a narrow workplace. However, the driving lever of the conditional universal joint still interferes with the ball head seat when the driving lever is in the swing position so that the driving lever cannot be sufficiently swung to be operated at a large angle.

The present invention is, therefore, arisen to obviate or at least mitigate the above-mentioned disadvantages.

SUMMARY OF THE INVENTION

The main object of the present invention is to provide a two-stage universal joint, including a sleeve and a driving member, which provides a large swingable angle of a driving member relative to a sleeve.

To achieve the above and other objects, the present invention provides a two-stage universal joint, including a sleeve, a driving member and a restricting member. The sleeve defines an axial direction and includes a receiving groove and an assembling portion. An inner wall of the receiving groove includes a plurality of first projections extending axially and a plurality of second projections extending axially. The plurality of first projections are disposed on an end of the receiving groove away from the assembling portion, and an annular recession is disposed between the plurality of first projections and the plurality of second projections. The plurality of second projections are located between the plurality of first projections and the assembling portion. The plurality of first projections have respective first inclined surfaces each disposed on an end away from the plurality of second projections and have respective first abutting surfaces, and each of the respective first inclined surfaces and one of the respective first abutting surfaces have an arcuate chamfer disposed therebetween. The plurality of second projections have respective second inclined surfaces each disposed on an end adjacent to the plurality of first projections and have respective second abutting surfaces. A distance from each of the respective first abutting surfaces to the axial direction is larger than a distance from each of the respective second abutting surfaces to the axial direction. The driving member includes a polygonal ball head which has a plurality of arcuate portions. The polygonal ball head is inserted into the receiving groove and each of the plurality of arcuate portions is abutted against one of the respective second abutting surfaces of the plurality of second projections, and the driving member is slidable between a first position and a second position relative to the sleeve. The restricting member is disposed on the annular recession. When the driving member is in the first position, the driving member is non-swingable about the polygonal ball head relative to the sleeve; when the driving member is in the second position, the driving member is swingable about the polygonal ball head relative to the sleeve, and the restricting member blocks the polygonal ball head within the receiving groove.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 4 is a partial cross-sectional view of a preferable embodiment of the present invention;

FIG. 5 is a partial enlargement of FIG. 4;

FIG. 6 is a partial top view of a preferable embodiment of the present invention;

DETAILED DESCRIPTION OF THE PREFERRED EMBODIMENTS

Figure 1:
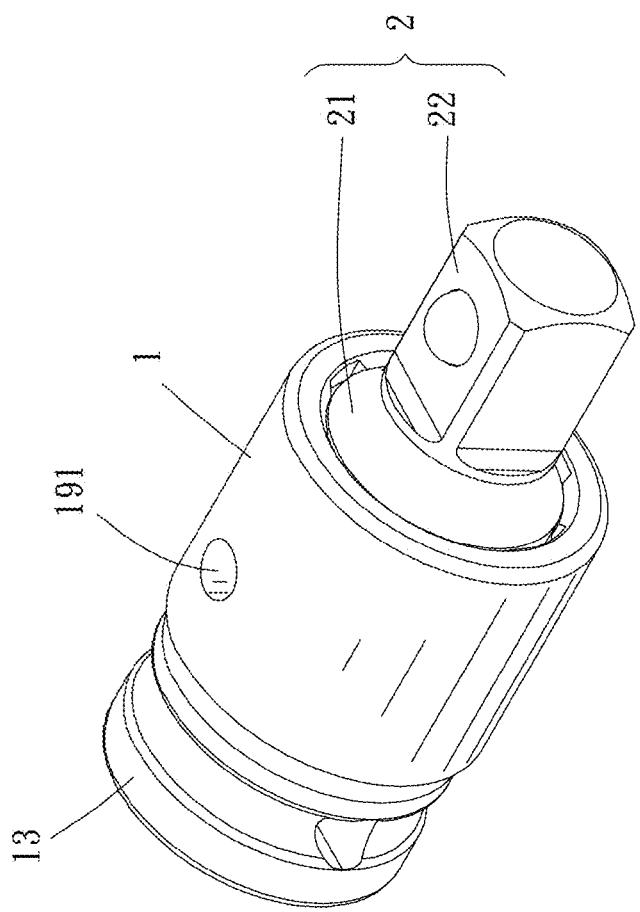
FIG. 1 is a stereogram of a preferable embodiment of the present invention.
Figure 2:
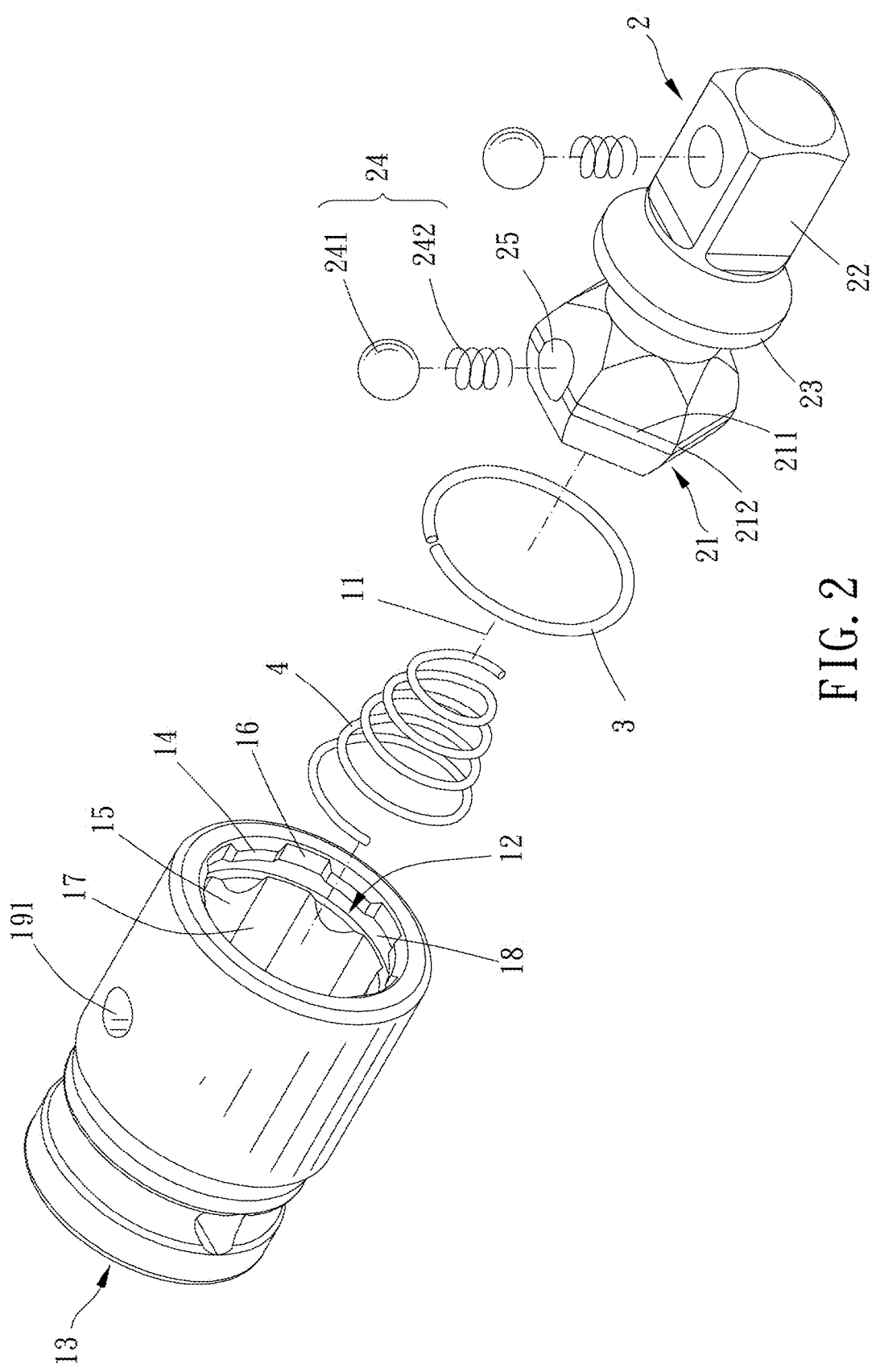
FIG. 2 is a breakdown drawing of a preferable embodiment of the present invention.
Figure 3:
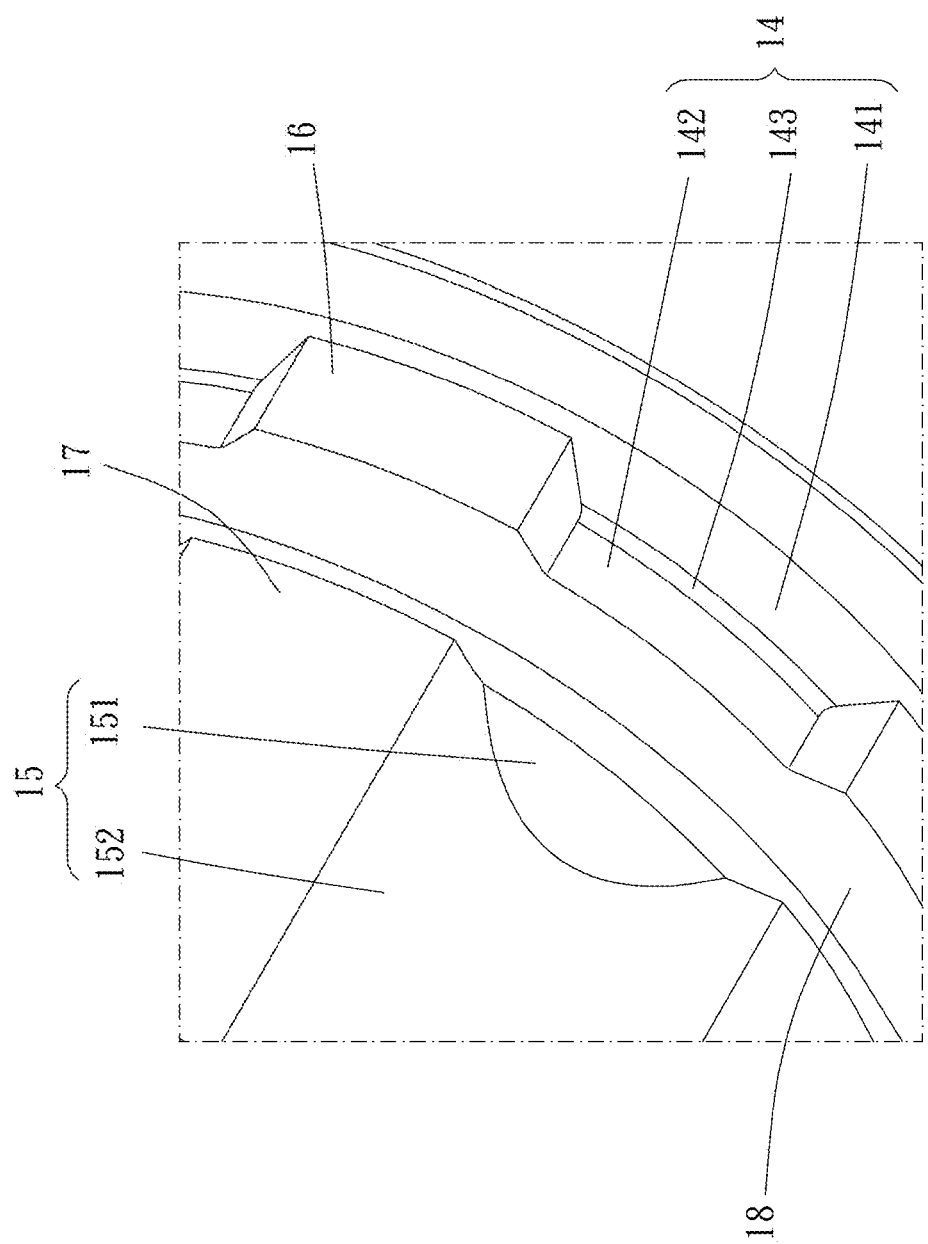
FIG. 3 is a partial enlargement of FIG. 2.

Please refer to FIGS. 1 to 9 for a preferable embodiment of the present invention. A two-stage universal joint of the present invention includes a sleeve 1, a driving member 2 and a restricting member 3.

The sleeve 1 defines an axis 11 and includes a receiving groove 12 and an assembling portion 13, and the assembling portion 13 is configured to be assembled to a rotatable tool. An inner wall of the receiving groove 12 includes a plurality of first projections 14 extending axially and a plurality of second projections 15 extending axially. The plurality of first projections 14 are disposed on an end of the receiving groove 12 away from the assembling portion 13. An annular recession 18 is disposed between the plurality of first projections 14 and the plurality of second projections 15. The plurality of second projections 15 are located between the plurality of first projections 14 and the assembling portion 13. The plurality of first projections 14 have respective first inclined surfaces 141 each disposed on an end away from the plurality of second projections 15 and have respective first abutting surfaces 142, and each of the respective first inclined surfaces 141 and one of the respective first abutting surfaces 142 has an arcuate chamfer 143 disposed therebetween. The plurality of second projections 15 have respective second inclined surfaces 151 each disposed on an end adjacent to the plurality of first projections 14 and have respective second abutting surfaces 152. A distance D1 from each of the respective first abutting surfaces 142 to the axis 11 is larger than a distance D2 from each of the respective second abutting surfaces 152 to the axis 11. Preferably, the respective first abutting surfaces 142 and the respective second abutting surfaces 152 are parallel to the axis 11.

The driving member 2 includes a polygonal ball head 21 which has a plurality of arcuate portions 211. The polygonal ball head 21 is inserted into the receiving groove 12 and each of the plurality of arcuate portions 211 is abutted against one of the respective second abutting surfaces 152 of the plurality of second projections 15, and the driving member 2 is slidable between a first position and a second position relative to the sleeve 1.

The restricting member 3 is disposed on the annular recession 18.

Figure 7:
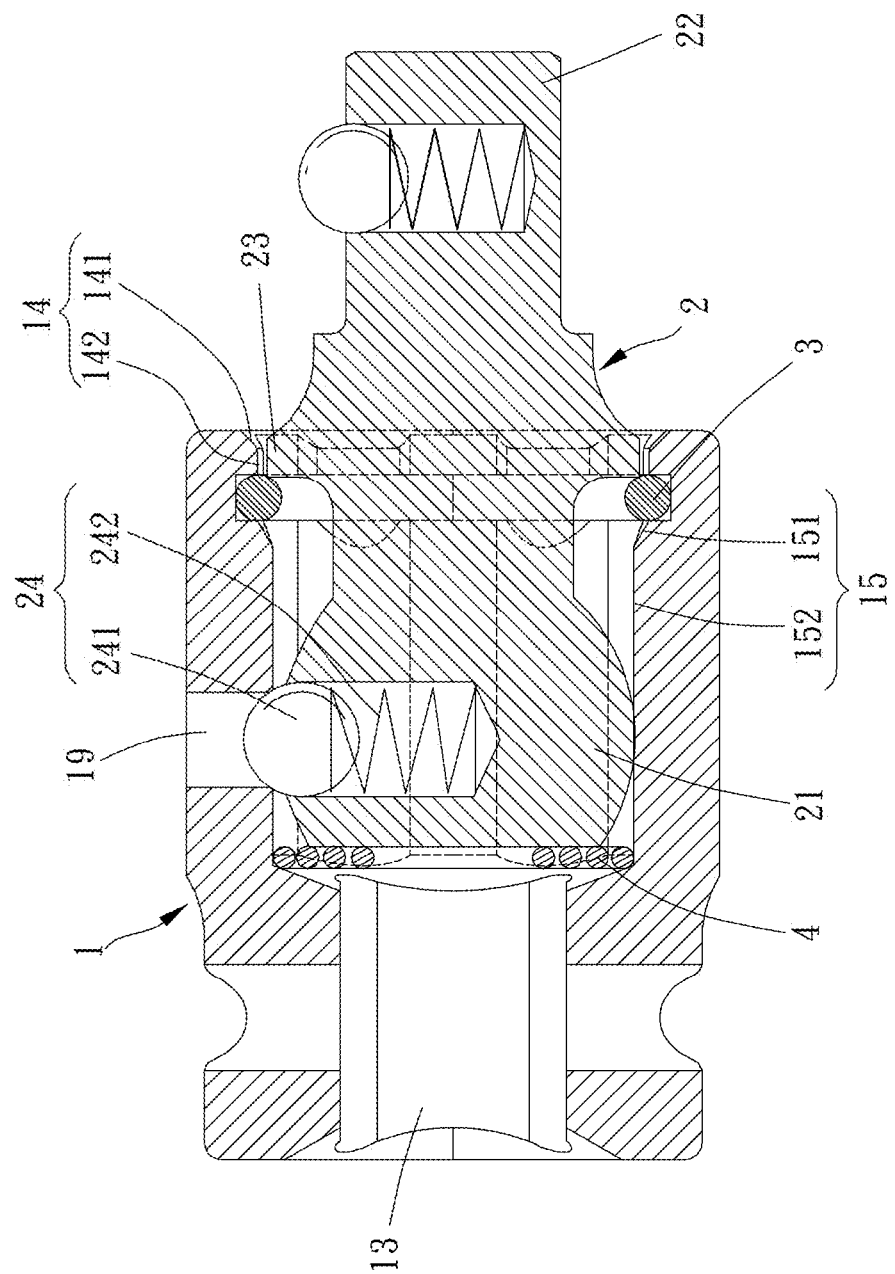
FIGS. 7 to 9 are cross-sectional views of a preferable embodiment of the present invention in operation.
Figure 8:
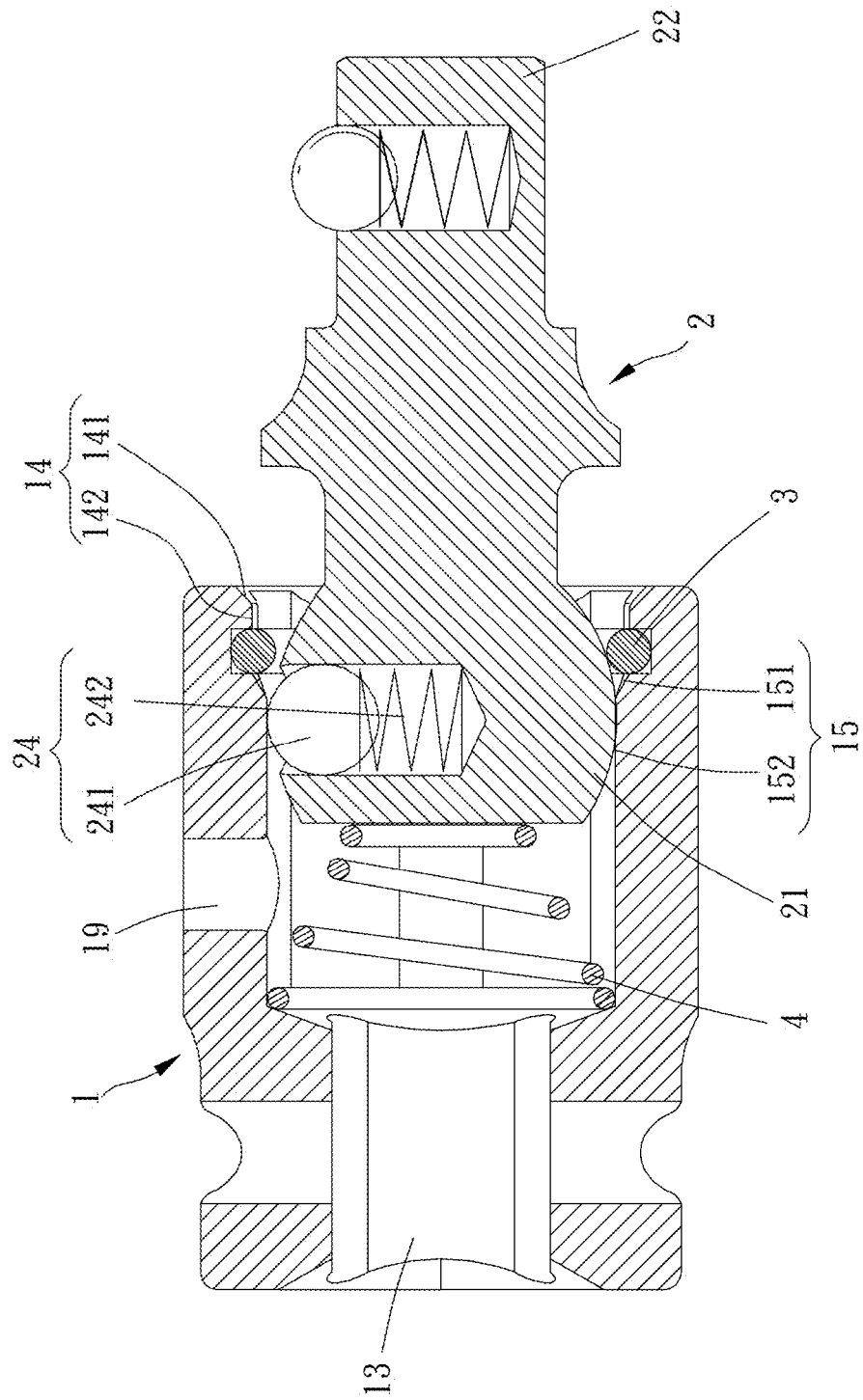
Figure 9:
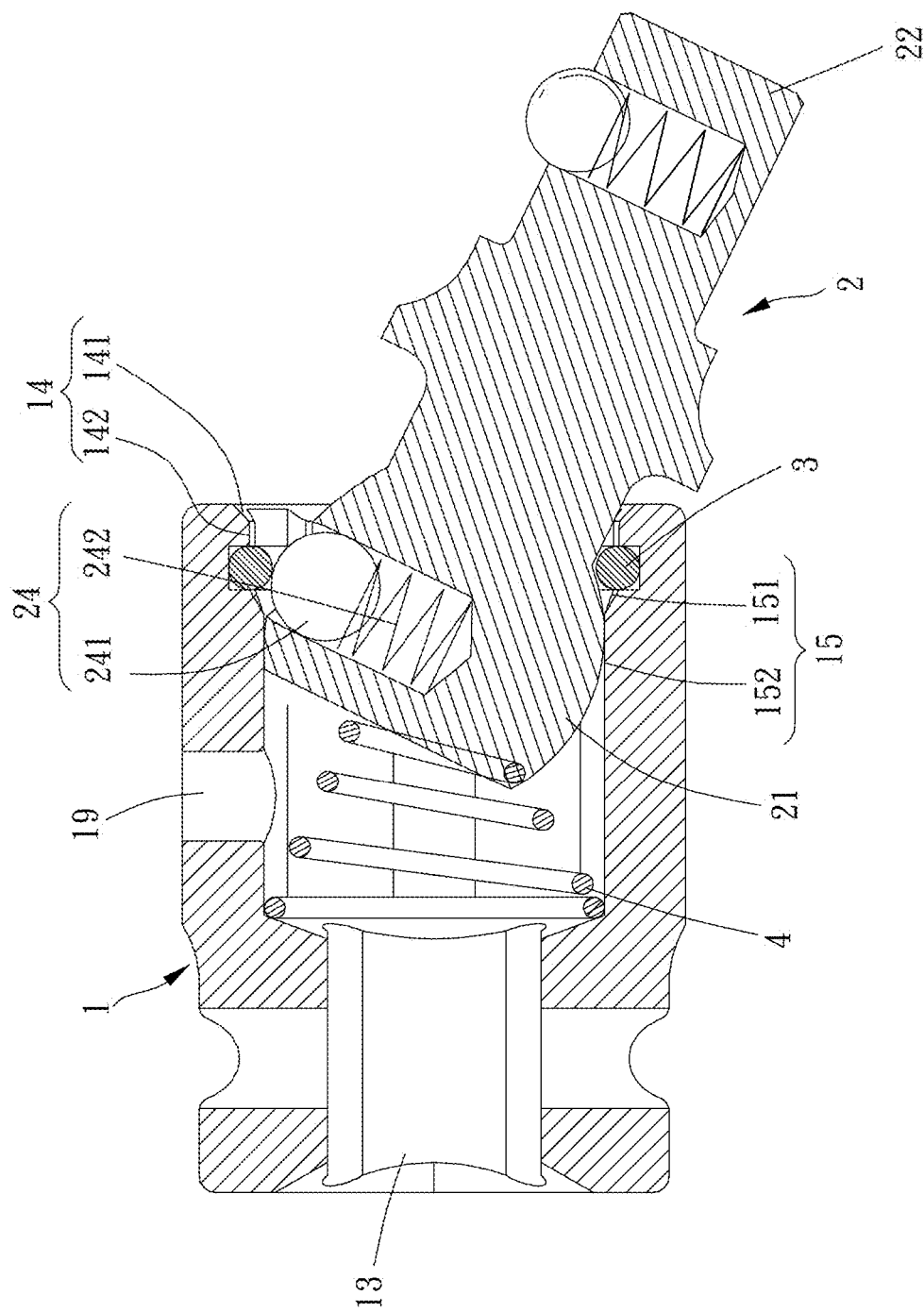

When the driving member 2 is in the first position (as shown in FIG. 7), the driving member 2 is non-swingable about the polygonal ball head 21 relative to the sleeve 1; when the driving member 2 is in the second position (as shown in FIGS. 8 and 9), the driving member 2 is swingable about the polygonal ball head 21 relative to the sleeve 1, and the restricting member 3 blocks the polygonal ball head 21 so as to prevent the polygonal ball head 21 from disengaging from the receiving groove 12. In this embodiment, the restricting member 3 is a C-shaped retainer which is convenient to be assembled and disassembled. In other embodiments, the restricting member may be engaging balls, blocking plate or the like.

Because the distance D1 from each of the respective first abutting surfaces 142 to the axial direction 11 is larger than the distance D2 from each of the respective second abutting surfaces 152 to the axial direction 11, the respective first abutting surfaces 142 are free of abutment against the driving member 2 when the driving member 2 is in the second position, so as to increase a swingable angle of the driving member 2 relative to the sleeve 1. Because of the configurations of the respective first inclined surfaces 141 and the respective second inclined surfaces 151, the polygonal ball head 21 is free of interference with the inner wall of the receiving groove 12 during insertion. Each of the respective first inclined surfaces 141 and one of the respective first abutting surfaces 142 have the arcuate chamfer 143 disposed therebetween so that said arcuate chamfers 143 can guide the polygonal ball head 21 to smoothly pass through the plurality of first projections 14 and be assembled within the receiving groove 12, which is convenient for assembling.

In this embodiment, each of the respective first abutting surfaces 142 is an arcuate concave surface so as to prevent the respective first abutting surfaces 142 from interfering with the swinging of the driving member 2; each of the respective second abutting surfaces 152 is an arcuate convex surface so as to effectively prevent the polygonal ball head 21 from rotating relative to the receiving groove 12. Preferably, a ratio of the distance D2 from one of the respective second abutting surfaces 152 to the axis 11 to the distance D1 from each of the respective first abutting surfaces 142 to the axis 11 is between 0.75 and 0.95. In this embodiment, the ratio is 0.9, which avoids interference between the respective first abutting surfaces 142 and the driving member 2.

The driving member 2 further includes a working portion 22 and a radial flange 23 which are integrally formed therewith. The radial flange 23 is disposed between the working portion 22 and the polygonal ball head 21. The radial flange 23 radially restrictedly corresponds to the respective first abutting surfaces 142 when the driving member 2 is in the first position so that the driving member 2 is non-swingable relative to the sleeve 1. The radial flange 23 is free of abutment radially against the respective first abutting surfaces 142 when the driving member 2 is in the second position so that the driving member 2 is swingable relative to the sleeve 1.

Specifically, the receiving groove 12 further includes a plurality of first concaves 16 extending axially and a plurality of second concaves 17 extending axially. The plurality of first concaves 16 and the plurality of first projections 14 are circumferentially disposed alternatively, and the plurality of second concaves 17 and the plurality of second projections 15 are circumferentially disposed alternatively. Between every adjacent two of the plurality of arcuate portions 211 of the polygonal ball head 21 is a corner portion 212 which is abutted against one of the plurality of second concaves 17. In this embodiment, numbers of the plurality of first projections 14 and the plurality of second projections 15 are even, any diametrically opposite two of the plurality of first projections 14 define a first distance L1, any diametrically opposite two of the plurality of first concaves 16 define a second distance L2, any diametrically opposite two of said corner portions 212 define a third distance L3, and the first distance L1 is shorter than the second distance L2 and the third distance L3 (as shown in FIG. 6), which prevents the polygonal ball head 21 from being inserted into the receiving groove 12 in a manner that said corner portions 212 correspond to the plurality of first projections 14.

Preferably, the polygonal ball head 21 has an resilient mechanism 24. The inner wall of the receiving groove 12 further has a recessed portion 19, and the recessed portion 19 is located between the assembling portion 13 and the plurality of second projections 15. The resilient mechanism 24 is elastically engaged within the recessed portion 19 when the driving member 2 is in the first position so as to restrict the driving member 2 from being unexpectedly moved to the second position. When the driving member 2 is moved in a direction toward the second position, the resilient mechanism 24 is disengaged from the recessed portion 19, and the driving member 2 is movable to the second position.

In this embodiment, the recessed portion 19 is a through hole 191 disposed on the receiving groove 12. The resilient mechanism 24 includes an engaging member 241 and a spring 242, and the polygonal ball head 21 has a receiving hole 25. The engaging member 241 is slidably disposed within the receiving hole 25, and the spring 242 is elastically abutted against and between a bottom of the receiving hole 25 and the engaging member 241 so that the engaging member 241 is normally urged outward and engaged within the through hole 191 when the driving member 2 is in the first position.

In this embodiment, the two-stage universal joint further includes an elastic member 4. The elastic member 4 is disposed between a bottom of the receiving groove 12 and the polygonal ball head 21 so that the driving member 2 has a tendency to move toward the second position. When the driving member 2 is in the second position, the elastic member 4 biases the polygonal ball head 21 toward the second position so as to prevent the driving member 2 from unexpectedly returning to the first position.

In summary, because of the configurations of the respective first inclined surfaces and the respective second inclined surfaces, the polygonal ball head is free of interference with the receiving groove during insertion. The said arcuate chamfers guide the polygonal ball head to be smoothly inserted into the receiving groove for easy assembling. Moreover, when the driving member is in the second position, the respective first abutting surfaces are free of abutment against the driving member so that the driving member has a larger swingable angle.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A two-stage universal joint, including:
a sleeve, defining an axis, including a receiving groove and an assembling portion, an inner wall of the receiving groove including a plurality of first projections extending axially and a plurality of second projections extending axially, the plurality of first projections being disposed on an end of the receiving groove away from the assembling portion, an annular recession being disposed between the plurality of first projections and the plurality of second projections, the plurality of second projections being located between the plurality of first projections and the assembling portion, the plurality of first projections having respective first inclined surfaces each disposed on an end away from the plurality of second projections and having respective first abutting surfaces, each of the respective first inclined surfaces and one of the respective first abutting surfaces having an arcuate chamfer disposed therebetween, the plurality of second projections having respective second inclined surfaces each disposed on an end adjacent to the plurality of first projections and having respective second abutting surfaces, a distance from each of the respective first abutting surfaces to the axis being larger than a distance from each of the respective second abutting surfaces to the axis;
a driving member, including a polygonal ball head which has a plurality of arcuate portions, the polygonal ball head being inserted into the receiving groove and each of the plurality of arcuate portions being abutted against one of the respective second abutting surfaces of the plurality of second projections, the driving member being slidable between a first position and a second position relative to the sleeve; and
a restricting member, disposed on the annular recession;
wherein when the driving member is in the first position, the driving member is non-swingable about the polygonal ball head relative to the sleeve; when the driving member is in the second position, the driving member is swingable about the polygonal ball head relative to the sleeve, and the restricting member blocks the polygonal ball head within the receiving groove.

2. The two-stage universal joint of claim 1, wherein each of the respective first abutting surfaces is an arcuate concave surface.

3. The two-stage universal joint of claim 1, wherein each of the respective second abutting surfaces is an arcuate convex surface.

4. The two-stage universal joint of claim 1, wherein the driving member further includes a working portion and a radial flange which are integrally formed therewith, the radial flange is disposed between the working portion and the polygonal ball head, the radial flange radially restrictedly corresponds to the respective first abutting surfaces when the driving member is in the first position, and the radial flange is free of abutment radially against the respective first abutting surfaces when the driving member is in the second position.

5. The two-stage universal joint of claim 1, wherein the receiving groove further includes a plurality of first concaves extending axially and a plurality of second concaves extending axially, the plurality of first concaves and the plurality of first projections are circumferentially disposed alternatively, the plurality of second concaves and the plurality of second projections are circumferentially disposed alternatively, between every adjacent two of the plurality of arcuate portions of the polygonal ball head is a corner portion which is abutted against one of the plurality of second concaves.

6. The two-stage universal joint of claim 5, wherein numbers of the plurality of first projections and the plurality of second projections are even, any diametrically opposite two of the plurality of first projections define a first distance, any diametrically opposite two of the plurality of first concaves define a second distance, any diametrically opposite two of said corner portions define a third distance, and the first distance is shorter than the second distance and the third distance.

7. The two-stage universal joint of claim 1, wherein the polygonal ball head has an resilient mechanism, the inner wall of the receiving groove further has a recessed portion, the recessed portion is located between the assembling portion and the plurality of second projections, the resilient mechanism is elastically engaged within the recessed portion when the driving member is in the first position, and when the driving member is moved in a direction toward the second position, the resilient mechanism is disengaged from the recessed portion, and the driving member is movable to the second position.

8. The two-stage universal joint of claim 7, wherein the recessed portion is a through hole disposed on the receiving groove, the resilient mechanism includes an engaging member and a spring, the polygonal ball head has a receiving hole, the engaging member is slidably disposed within the receiving hole, and the spring is elastically abutted against and between a bottom of the receiving hole and the engaging member.

9. The two-stage universal joint of claim 1, further including an elastic member, wherein the elastic member is disposed between a bottom of the receiving groove and the polygonal ball head so that the driving member has a tendency to move toward the second position.

10. The two-stage universal joint of claim 1, wherein a ratio of the distance from each of the respective second abutting surfaces to the axis to the distance from one of the respective first abutting surfaces to the axis is between 0.75 and 0.95.

* * * * *